United States Patent Office 3,723,148
Patented Mar. 27, 1973

3,723,148
PROCESS FOR RECOVERING COATING MATERIALS
George L. Tupper, St. Clair Shores, Mich., assignor to Oxy Metal Finishing Corporation, Warren, Mich.
No Drawing. Continuation of abandoned application Ser. No. 798,169, Feb. 10, 1969. This application Mar. 15, 1971, Ser. No. 124,435
Int. Cl. B05c 11/10
U.S. Cl. 106—287 PR      3 Claims

ABSTRACT OF THE DISCLOSURE

A process for deactivating or "killing" the overspray particles of a paint or similar coating material which comprise contacting the material with an aqueous alkaline solution which contains an organic nitrogen compound of the formula:

wherein $R_1$, $R_2$ and $R_3$ are independently selected from the group consisting of hydrogen, alkanol and hydroxy ether groups, which latter groups contains from about 2 to 10 carbon atoms, at least one of $R_1$, $R_2$ and $R_3$ being other than hydrogen, the organic nitrogen compound having a boiling point of at least about 100 degrees C. and a molecular weight which is not substantially in excess of about 500. Preferably, the alkaline solution is an aqueous solution of sodium hydroxide and/or sodium silicate and the preferred organic nitrogen compound is triethanol amine.

---

This application is a continuation of copending U.S. Ser. No. 798,169, filed Feb. 10, 1969 and now abandoned.

This invention relates to a composition and process for the treatment of overspray paint or similar coating material and more particularly it relates to the treatment of such overspray coating materials so as to deactivate or denature them.

In the spray application of paints or similar coating materials in a spray booth, the overspray coating material, i.e., the particles of the paint or other coating which do not adhere to the articles being sprayed, are trapped or collected in a water film or curtain in the spray booth. Conventionally, various chemical agents are added to the spray booth water to deactivate or denature the paint particles so that they will not form into a sticky mass which is both difficult to handle and which adheres to the spray booth or water circulation system. Although many materials have been used for this purpose, it has been found that in order to obtain the optimum operating conditions in the spray booth, it is not sufficient that the chemical agents added are merely effective in denaturing or deactivating the paint, i.e., rendering it non-tacky. Rather, the degree of the denaturing or deactivation of the paint particles has been found to be extremely important.

With many of the prior art additives which have been used, the deactivation of the paint particles has not been sufficiently complete so as to render them substantially non-tacky. This, thus, results in there still being some sticky masses of paint particles in the collection water, which condition is obviously not desirable. In other instances, the denaturing agents used have been found to be to effective. In such cases, the paint particles are over-denatured, i.e., the tackiness of the particles is removed to the extent that the resulting sludge is of a chalky nature. When this occurs, the particles will not coagulate but, rather, break up, and sink to the bottom of and/or remain suspended in the aqueous collecting media. Under these circumstances, the separation of the denatured particles from the water system becomes very difficult.

It has, therefore, been found that for a denaturing agent to provide the optimum effectiveness, it must completely remove the tackiness of the overspray paint particles, so that there is no tendency for these to form sticky masses which will adhere to the equipment, but this denaturing must not be such as to prevent the particles from co-agulating into a blanket of floating sludge which is most easily removed from the water system. Up to the present time, the denaturing agents proposed have not been completely successful in accomplishing these results.

It is, therefore, an object of the present invention to provide an improved composition for the denaturing or deactivating of the overspray paint or similar coating materials in a spray booth system.

A further object of the present invention is to provide an improved process for the denaturing or deactivating of the overspray paint or similar coating materials in the operation of a spray booth system.

These and other objects will become apparent to those skilled in the art from the description of the invention which follows.

Pursuant to the above objects, the present invention includes an aqueous composition suitable for deactivating paint and similar coating particles, which composition comprises an aqueous solution containing a deactivating amount of an organic nitrogen compound of the formula:

wherein $R_1$, $R_2$ and $R_3$ are independently selected from the group consisting of hydrogen, alkanol and hydroxy ether groups, which groups contain from about 2 to 10 carbon atoms, at least one of $R_1$, $R_2$ and $R_3$ being other than hydrogen, the organic nitrogen compound having a boiling point of at least about 100 degrees C. and a molecular weight which is not substantially in excess of about 500. When this composition is used in the aqueous collection system in a spray booth, it is found that not only are the paint particles rendered substantially non-tacky but, additionally, they coagulate into a blanket of floating sludge which is easily removed from the aqueous collection system.

More specifically, the aqueous composition of the present invention is desirably an aqueous alkaline solution containing the above-described organic nitrogen compound. The alkaline materials in this composition may be one or more of an alkali metal hydroxide, an alkali metal silicate, an alkali metal phosphate, an alkali metal carbonate or the like. Exemplary of the alkali metal silicates and alkali metal phosphates which may be used are the alkali metal ortho silicates and metasilicates and the trialkali metal phosphates, alkali metal pyrophosphates, alkali metal tripolyphosphates and the like. Desirably, these alkaline materials are present in the composition in amounts within the range of about 5 to 50% by weight of the composition with amounts within the range of about 15 to 30% by weight of the composition being preferred.

It is to be understood, of course, that the foregoing amounts refer to the total of these alkaline materials in the composition and that these totals may be made up of one or more of the alkaline materials. In many instances, it has been found to be desirable if the selection of the type and quantity of materials used is such as to provide a pH in the aqueous collecting system within the range of about 9.0 to 12.8, a pH value within the range of about 9 to 10.5 being preferred.

It is to be understood, of course, that as used in the specification and claims, the term "alkali metal" is intended to refer to lithium, sodium, potassium, cesium and rubidium. In many instances, the preferred alkali metal has been found to be sodium, so that primary reference hereinafter will be made to the compounds of sodium. This is not, however, to be taken as a limitation of the present invention but merely as being exemplary thereof, since other alkali metal compounds, such as the potassium compounds and the like, are also useful.

The aqueous compositions of the present invention also contain a deactivating amount of an organic nitrogen compound. Desirably, the organic nitrogen compound is present in the composition in an amount within the range of about 2 to 35% by weight, with amounts within the range of about 5 to 15% by weight being preferred.

The organic nitrogen compounds which may be used are mono-, di-, or tri-, alkanol or hydroxy ether amines, having the formula as has been set forth hereinabove. These organic nitrogen compounds have a boiling point of at least about 100 degrees C. and a molecular weight which is not substantially in excess of about 500. Additionally, the alkanol and hydroxy ether substituent groups thereof each contain from about 2 to 10 carbon atoms, with from about 2 to 6 carbon atoms being preferred. Exemplary of specific organic nitrogen compounds which may be used are monoisopropyl amines;
monoethanolamine;
diethanolamine;
triethanolamine;
2-amino-2-methyl-1-propanol;
2-amino-2-methyl-1,3-propane diol;
diglycolamine;
trihexanolamine;
dioctanolamine;
monodecanolamine;
tributanolamine;
dipentanolamine;
tri(2[hydroxyethoxy]ethyl)amine;
4[6-hydroxyhexoxy]butylamine;
6[4-hydroxybutoxy]hexylamine;
5[2-hydroxyethoxy]pentylamine;
2-hydroxyethoxymethylamine;
di(3[2-hydroxyethoxy]propyl(amine);

and the like.

Of the above organic nitrogen compounds, in many instances, triethanolamine has been found to be preferred. Accordingly, hereinafter particular reference will be made thereto. This is not, however, to be taken as a limitation on the organic nitrogen compounds which may be used as other compounds in this group, such as diglycol amine and the like, are also useful.

In carrying out the method of the present invention, the aqueous composition as described hereinabove, is incorporated in the collecting water system of a paint spray booth or other spray chamber. Desirably, the denaturing composition, either as the organic nitrogen compound alone or in combination with the alkaline material, is incorporated in the water of the spray booth system in an amount within the range of about 5 to 60 pounds per 1000 gallons of water in the system, with amounts within the range of about 5 to 20 pounds per 1000 gallons of water being preferred. The overspray paint is collected or trapped in this water, the water being circulated within the spray booth or similar spray compartment in such a manner as it comes into contact with the overspray paint or other coating materials. As will be appreciated by those in the art, the exact nature of this circulation will, of course, depend upon the design of the particular spray booth which is used.

In general, the water is circulated so as to form a water film or curtain on one or more walls of the booth and this water is then collected in a reservoir or sump from which it is recirculated. When operating in accordance with the method of the present invention, it is found that the overspray paint or other coating particles are effectively denatured in coming in contact with the circulating water containing the deactivating composition of the present invention and that within the reservoir or sump, the denatured particles coagulate into a blanket of floating sludge, substantially all of which remains on the surface of the liquid in the sump with little or no settling or suspension of the particles in the main body of the liquid in the sump. In this manner, the denatured paint particles are easily removed from the sump, e.g., by skimming the blanket of floating sludge from the top of the liquid.

It is to be appreciated, that in the operation of the present process, the active ingredients of the denaturing composition in the water system of the spray booth will be depleted. Accordingly, replenishment of the activating composition wil be necessary in order that effective denaturing of the paint particles will be contined. This replenishment may be accomplished in any convenient manner, as for example, by adding, on either a periodic or continuous basis, amounts of the activating composition as are necessary to maintain the desired level of this material in the spray booth water system. The exact amounts of the deactivating additives which will be needed to maintain the desired denaturing properties in the water solution will, of course, depend upon the nature and amount of the paint or other coating material which is being sprayed. In general, however, it has been found that the continuous addition of the deactivating additive at the rate of only a few milliliters per minute will generally be sufficient to maintain the necessary concentration of this material in the spray booth water system.

While the composition and process of the present invention is effective in the denaturing or deactivating of numerous paint systems, it has been found that the improved results obtained with this system are particularly pronounced when it is used with an acrylic paint. Such paints are particularly susceptible to over-denaturing, with the resulting formation of the chalky, noncohesive paint particles which the compositions and processes of the present invention overcome.

In order that those skilled in the art may better understand the present invention and the manner in which it may be practiced, the following specific examples are given. In these examples, unless otherwise indicated, parts and percents are by weight and temperatures are in degrees centigrade. It is to be appreciated, however, that these examples are merely exemplary of the present invention and the manner in which it may be practiced and are not to be taken as a limitation thereof.

EXAMPLE 1

A deactivating composition was formulated by admixng the following components in the amounts indicated:

| Components: | Percent by weight |
|---|---|
| Sodium hydroxide | 7 |
| Liquid silicate (8.9% $Na_2O$ and 28.7% $SiO_2$) | 30 |
| Triethanolamine | 5 |
| Water | 58 |

30 milliliters of this solution was added to three gallons of water, which water was circulated through a paint spray booth. An acrylic paint was sprayed into the spray booth and collected in the water curtain of the booth. In the reservoir of the spray booth, there was formed on the surface of the water a floating blanket of denatured paint sludge, substantially none of which sank or was suspended in the water solution. This sludge was easily removed from the reservoir by skimming and upon examination was found to be in a substantially completely nontacky condition.

EXAMPLE 2

By way of comparison, the procedure of Example 1 was repeated with the exception that the triethanolamine was not incorporated in the aqueous deactivating composition. Upon using this solution in the paint spray booth, in the same manner as in Example 1, it was found that the denatured paint particles in the reservoir of the booth were suspended throughout the entire volume of liquid in the reservoir, with appreciable quantity of these particles settling to the bottom of the reservoir. Because of the distribution of these particles in the reservoir liquid, they could not be removed by skimming and upon examination were found to be very chalky in nature.

EXAMPLE 3

The procedure of Example 1 was repeated with the exception that diglycolamine was substituted for the triethanolamine in the aqueous deactivating composition. When this material was used in the spray booth water system in the same manner as in Example 1, it was found that the paint particles were effectively denatured and formed as a floating blanket of sludge in the reservoir of the spray booth with substantially no sinking or suspension of the particles in the reservoir liquid.

While there have been described various embodiments of the invention, the compositions and method described are not intended to be understood as limiting the scope of the invention as changes therewithin are possible and it is intended that each element recited in any of the following claims is to be understood as referring to all equivalent elements for accomplishing substantially the same result in substantially the same or equivalent manner, it being intended to cover the invention broadly in whatever form its principle may be utilized.

What is claimed is:

1. A process which substantially removes the tackiness of over-spray acrylic paint comprising contacting the over-spray acrylic paint with an aqueous solution containing from about 5 to 60 pounds per 1,000 gallons of solution of a tackiness removing solution containing (a) from about 5 to 50% of an alkaline material selected from a group consisting of alkaline metal hydroxides, alkaline metal silicates, alkaline metal phosphates, and alkaline metal carbonates, and (b) from about 2 to 35% by weight of an organic nitrogen compound having the formula:

wherein $R_1$, $R_2$ and $R_3$ are independently selected from the group consisting of hydrogen, alkanol and hydroxy ether groups, which groups contain from about 2 to 10 carbon atoms, at least one of $R_1$, $R_2$ and $R_3$ being other than hydrogen, the compound having a boiling point of at least about 100 degrees C. and a molecular weight which which is not substantially in excess of about 500, and forming the contacted paint into a body of sludge, substantially all of which is floating on the surface of the aqueous system.

2. The process as claimed in claim 1 wherein the organic compound is selected from the group consisting of triethanolamine and diglycolamine.

3. A process which substantially removes the tackiness of over-spray acrylic paint which comprises contacting the over-spray paint with an aqueous solution containing from about 5 to 60 pounds per 1,000 gallons of solution of an organic nitrogen compound having the formula:

wherein $R_1$, $R_2$ and $R_3$ are independently selected from the group consisting of hydrogen, alkanol, and hydroxy ether groups, which groups contain from about 2 to 10 carbon atoms, at least one of $R_1$, $R_2$ and $R_3$ being other than hydrogen, the compound having a boiling point of at least about 100 degrees C. and a molecular weight not substantially in excess of about 500, and forming the contacted paint into a body of sludge, substantially all of which is floating on the surface of the aqueous solution.

References Cited

UNITED STATES PATENTS

| | | | |
|---|---|---|---|
| 2,992,995 | 7/1961 | Arden | 134—39 X |
| 3,053,897 | 9/1962 | Clark et al. | 134—38 X |
| 3,173,879 | 3/1965 | Arnold et al. | 117—102 R |
| 3,417,025 | 12/1968 | Cooper et al. | 134—38 X |
| 3,515,575 | 6/1970 | Arnold | 117—102 R |

LORENZO B. HAYES, Primary Examiner

U.S. Cl. X.R.

117—102 R; 134—38